United States Patent
Greenfield et al.

(10) Patent No.: US 9,494,471 B2
(45) Date of Patent: Nov. 15, 2016

(54) FAST RESPONSE THERMOPILE POWER SENSOR

(75) Inventors: Ephraim Greenfield, Jerusalem (IL); Eliyahu Bender, Jerusalem (IL); Shimon Elstein, Mercaz Shapira (IL)

(73) Assignee: OPHIR OPTRONICS SOLUTIONS LTD., Jerusalem (IL)

( * ) Notice: Subject to any disclaimer, the term of this patent is extended or adjusted under 35 U.S.C. 154(b) by 596 days.

(21) Appl. No.: 13/990,145

(22) PCT Filed: Nov. 29, 2011

(86) PCT No.: PCT/IL2011/000909
§ 371 (c)(1),
(2), (4) Date: May 29, 2013

(87) PCT Pub. No.: WO2012/073235
PCT Pub. Date: Jun. 7, 2012

(65) Prior Publication Data
US 2013/0250997 A1     Sep. 26, 2013

Related U.S. Application Data

(60) Provisional application No. 61/344,957, filed on Nov. 29, 2010, provisional application No. 61/457,183, filed on Jan. 24, 2011.

(51) Int. Cl.
*G01K 11/00* (2006.01)
*G01K 17/00* (2006.01)

(52) U.S. Cl.
CPC ............ *G01K 11/00* (2013.01); *G01K 17/003* (2013.01)

(58) Field of Classification Search
USPC .................................... 374/161, 45; 356/121
See application file for complete search history.

(56) References Cited

U.S. PATENT DOCUMENTS

| | | | | |
|---|---|---|---|---|
| 5,033,866 A | * | 7/1991 | Kehl | G01K 17/00 136/225 |
| 5,695,283 A | * | 12/1997 | Johnson | G01J 5/16 136/208 |
| 5,982,014 A | * | 11/1999 | Paige | G01K 7/028 136/212 |
| 6,348,650 B1 | * | 2/2002 | Endo | G01J 5/12 136/201 |
| 2002/0037026 A1 | | 3/2002 | Sato et al. | |
| 2007/0095380 A1 | | 5/2007 | Dewes et al. | |
| 2008/0130710 A1 | | 6/2008 | Dewes et al. | |
| 2010/0265989 A1 | | 10/2010 | Dewes et al. | |

OTHER PUBLICATIONS

PCT International Search Report and Written Opinion of the ISA, mailed Apr. 19, 2012 in PCT/IL11/00909, 12 pages.

\* cited by examiner

*Primary Examiner* — Lisa Caputo
*Assistant Examiner* — Nasir U Ahmed
(74) *Attorney, Agent, or Firm* — Maine Cernota & Rardin

(57) ABSTRACT

A power measuring sensor for an optical beam which utilizes the temperature difference across a thin layer of heat insulating material, generated by the axial flow of the absorbed beam, from an absorber layer on which the beam impinges, to a cooled heat sink which dissipates the heat after passage through the sensor. The axial heat flow is measured by means of a continuous matrix of adjacent thermocouple junctions over the heat flow region of the sensor disc, with the thermal insulating layer, which generates the temperature drop, having thicker and thinner regions at alternate junctions. The junctions on the thicker regions of the insulator thus become the hot junctions, and those on the thinner regions of the insulating layer become the cold junctions, and the sum of the voltages generated by the thermocouples is proportional to the flow of heat, and thus to the incident optical power.

15 Claims, 8 Drawing Sheets

FAST RESPONSE THERMOPILE POWER SENSOR

RELATED APPLICATIONS

This application is national application filed under 35 U.S.C. §371 of PCT Application No. PCT/IL2011/000909, filing date Nov. 29, 2011, which claims priority of U.S. Provisional Application No. 61/344957, filing date Nov. 29, 2010 and U.S. Provisional Application No. 61/257183, filing date Jan. 24, 2011. Each of these applications are herein incorporated by reference in their entirety for all purposes.

FIELD OF THE INVENTION

The present invention relates to the field of laser power measurements, and especially to the ability to monitor rapid changes in laser power.

BACKGROUND OF THE INVENTION

A common form of thermal sensor for laser power measurement is based on a thermopile, disposed on the outer periphery of a thermally conductive disc, so that it measures the radial temperature gradient of the disc at the outer periphery. FIG. 1 illustrates such a prior art disc, with the laser beam 15 impinging in the central section of the disc and the disc cooled around its periphery 12. The heat flows radially, causing a temperature drop between the hot and cold thermocouple junctions thus producing a voltage proportional to power input. The thermopile 10 is located towards the outer edge of the disc, and the cooling region is at the periphery 12, outside of the thermopile. FIG. 2 shows such a disc 20 mounted in a laser power meter head, with its outer edge 22 in good thermal contact with the body of the head 23, which can be air or water cooled, and the heat flow across the thermocouple 10.

The advantage of this arrangement is that the power reading is largely independent of beam position and size as long as the beam is inside the inner junctions of the thermopile ring. The disadvantage is that even with time response accelerating circuits and software, the response time of such a sensor is typically no faster than 1 sec. for reaching 95% of the final reading. The reason for this is the need for the heat deposited onto the center of the disc to travel by conduction radially to the cooled outer region. Typically, for a disc designed to measure powers of the order of a few tens of Watts, this distance is of the order of 10 mm In addition, due to the relatively long heat path, the power handling capacity of such a sensor may be limited.

There therefore exists the need for a thermopile power sensor that is able to handle at least the high power levels of prior art radial flow thermopile power sensors, but which has a substantially faster response time than that of such prior art radial flow sensors.

The disclosures of any publications mentioned in this section and in other sections of the specification, are hereby incorporated by reference, each in its entirety.

SUMMARY OF THE INVENTION

The power measurement discs described in this disclosure achieve a faster response by substantially shortening the distance the heat has to travel from the point of impingement on the disc, to the point of heat sinking of the absorbed power. There is described a laser power sensor, similar in dimensions to the above-described prior art radial thermopile type, but arranged so that the heat flow path is much shorter, thus providing response times faster by an order of magnitude or more. This short heat flow path is provided by allowing the heat generated by the power incident on an absorber surface of the disc to flow axially across a thin heat insulating layer between two thermopiles, with the operative temperature measurement junctions being in the central region of the device, situated in the region of the heat flow. The pair of thermopiles operate in this configuration as temperature measurement devices, with their hot junctions in the region where the heat flow passes. Since the temperature drop across the heat insulating layer is proportional to the heat flow across it, the difference in temperature measured between the central regions of the two thermopiles provides a measure of the incident power. The cold outer junctions of both of the thermopiles are assumed to be essentially at the same temperature, since they are not in the path of the heat flow, such that the difference in outputs of the two thermopiles is proportional to the difference in temperatures between the hot junctions, which itself is proportional to the axial heat flow across the disc. This arrangement can be implemented in practice by sandwiching the heat insulating layer between a pair of thermopiles having hot junctions in the central region and cold junctions in the outer region. The heat flowing axially down the stack is absorbed by a cooled heat sink covering the whole of the area of the thermopiles.

As a further implementation of the axial flow power sensors of this disclosure, a single layer thermopile can be used instead of the double layers described hereinabove. The thermopiles are then constructed in the form of a continuous matrix of adjacent thermocouple junctions over the heat flow region of the sensor disc, with the thermal insulating layer, which generates the temperature drop, being thicker at alternate junctions. The junctions on the thicker regions of the insulator thus become the hot junctions, and those on the thinner regions of the insulating layer become the cold junctions. The heat drop across the insulating layer is thus generated on adjacent rather than collinear hot and cold junctions. Such a structure may provide a more uniform heat absorption configuration over a larger area, and may be simpler to construct because of the smaller number of component parts, and the simpler planar deposition method of construction.

There is thus provided in accordance with a first exemplary implementation of the devices described in this disclosure, a measuring device for an optical beam comprising:
(i) a cooled heat sinking element,
(ii) thermally insulating material disposed on the heat sinking element, the thermally insulating material having adjacent regions of greater and lesser thickness,
(iii) thermocouples applied in at least one serial array over the thermally insulating material, the at least one serial array having a first set of junctions disposed on the regions of greater thickness and a second set of junctions disposed on the regions of lesser thickness, and
(iv) a surface for absorbing the optical beam, disposed over the thermally insulating material and its associated a least one array of thermocouples,
wherein the summed electrical output from the thermocouples provides a measure of the power of the optical beam impinging on the absorbing surface.

In the above described measuring device, the thermally insulating material may comprise a single layer disposed on the cooled heat sinking element, the single layer having regions of greater thickness and regions of lesser thickness, or it may comprise regions of the thermally insulating material disposed on a thin insulating coating applied to the cooled heat sinking element. Furthermore, the regions of greater thickness of the thermally insulating material may comprise separated pedestals, on each pedestal being disposed one of the first set of junctions or alternatively, the regions of greater thickness of the thermally insulating material may comprise separate strips on which are disposed a linear plurality of the first set of junctions.

Yet another implementation of these measuring devices may involve having at least one of the thermocouples at the first set of junctions comprising:
(i) a first thermoelectric layer disposed on a region of greater thickness and bridging down to a first adjacent region of lesser thickness, and
(ii) a second thermoelectric layer in contact with the first thermoelectric layer on the region of greater thickness and bridging down to a second adjacent region of lesser thickness located at the side of the region of greater thickness opposite to that of the first adjacent region of lesser thickness.

In any of such previously described measuring devices, at least some of the thermally insulating material, the serial array of thermocouples, and the surface for absorbing the optical beam may comprise either plasma sprayed layers or sputtered layers.

Additionally, any of the above-described measuring devices may further comprise an integrating circuit receiving the electrical output from the serial thermocouple array, such that the energy of at least one pulse of the beam can be determined by integrating over time the electrical output arising from the at least one pulse.

Another exemplary implementation can involve a device for measuring an optical beam, comprising:
(i) a thermopile having one type of its junctions disposed on thicker regions of a thermally insulating layer, and the other type of its junctions disposed on adjacent regions of the thermally insulating layer, the adjacent regions having a thickness less than that of the thicker regions,
(ii) a surface for absorbing the power of the optical beam disposed in thermal contact with one surface of the thermopile, and
(iii) a heat sinking element disposed in thermal contact with the thermally insulating layer on the side thereof adjacent to the other surface of the thermopile over at least the majority of the second thermopile's surface,
wherein the electrical output of the thermopile provides a measure of the optical power of the beam impinging on the absorbing surface.

In such a measuring device, the thermally insulating material may comprise a single layer disposed on the heat sinking element, the single layer having regions of greater thickness and regions of lesser thickness, or it may comprise regions of the thermally insulating material disposed on a thin insulating coating applied to the cooled heat sinking element. Furthermore, the regions of greater thickness of the thermally insulating material may comprise separated pedestals, on each pedestal being disposed one of the first set of junctions or alternatively, the regions of greater thickness of the thermally insulating material may comprise separate strips on which are disposed a linear plurality of the first set of junctions.

Any of these devices for measuring an optical beam may optionally further comprise an integrating circuit receiving the electrical output from the thermopile, such that the energy of at least one pulse of the beam can be determined by integrating over time the electrical output arising from the at least one pulse.

Still other example implementations involve a measuring sensor for an optical beam, said measuring sensor comprising:
(i) a first thermopile having hot junctions in its central region and cold junctions in its peripheral region,
(ii) a second thermopile having hot junctions in its central region and cold junctions in its peripheral region,
(iii) a heat insulating layer sandwiched between the first and second thermopiles,
(iv) a surface layer for absorbing the optical beam, disposed in thermal contact with the central region of the first thermopile, and
(v) a heat sinking element disposed in thermal contact with the second thermopile over at least the majority of the second thermopile's surface,
wherein the difference in outputs between the first and the second thermopiles provides a measure of the power of the optical beam impinging on the absorbing surface.

In such a measuring sensor, the first and second thermopiles, the heat insulating layer and the surface absorbing layer may all be formed by planar deposition processes onto the heat sinking element, or at least some of the first and second thermopiles, the heat insulating layer and the surface absorbing layer may be constructed as separate elements, and the measuring sensor comprises an assembly of the separate elements. Furthermore, any of these sensors for measuring an optical beam may further comprise an integrating circuit receiving the electrical output from the thermopile, such that the energy of at least one pulse of the beam can be determined by integrating over time the electrical output arising from the at least one pulse.

Finally, a further exemplary implementation of the optical beam measuring devices described in this disclosure may comprise:
(i) a layer of thermally resistive material,
(ii) a pair of thermopiles disposed on opposite surfaces of the layer of thermally resistive material, the themopiles having one set of junctions disposed in the region where the impinging optical beam is adapted to traverse, and a second set of junctions in a region where the impinging optical beam is adapted not to traverse,
(iii) a surface for absorbing the optical beam, disposed on one surface of the layer of thermally resistive material with its associated thermopiles, in the region where the optical beam is adapted to impinge, and
(iv) a heat sinking element disposed on the other surface of the layer of thermally resistive material with its associated thermopiles, over at least the majority of the area of the layer of thermally resistive material with its associated thermopiles,
wherein the difference in outputs between the first and the second thermopiles provides a measure of the power of the optical beam impinging on the absorbing surface. In such an optical beam measuring device, the region where the impinging optical beam is adapted to traverse should be located centrally relative to the region where the impinging optical beam is adapted not to traverse.

It is to be understood that although the term disc is generally meant to describe a circular, thin, plate-like shape, the present invention is not intended to be limited to circular disc shapes, and the use of the term disc is intended in the present disclosure also to cover thin plates having other than circular shapes.

BRIEF DESCRIPTION OF THE DRAWINGS

The present invention will be understood and appreciated more fully from the following detailed description, taken in conjunction with the drawings in which.

DETAILED DESCRIPTION

Figure 1:
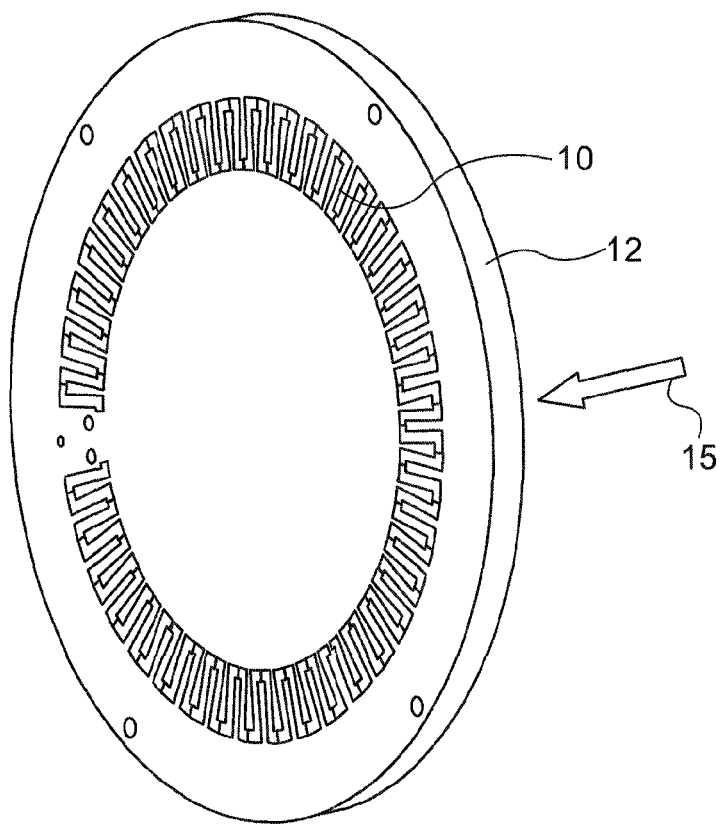
FIG. 1 shows schematically a prior art disc, with a peripherally disposed thermopile.
Figure 2:
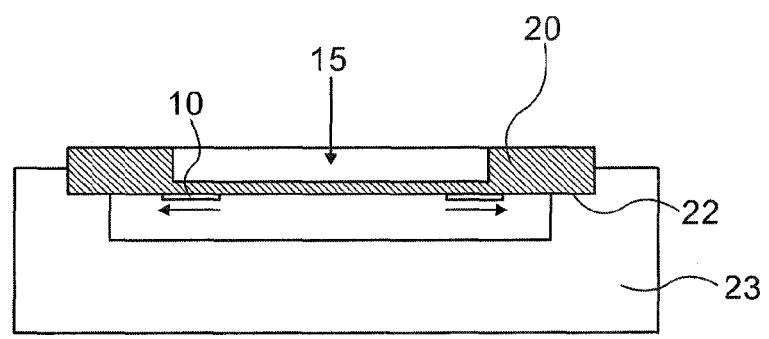
FIG. 2 shows the prior art disc of FIG. 1 mounted in a laser power meter head.
Figure 3:
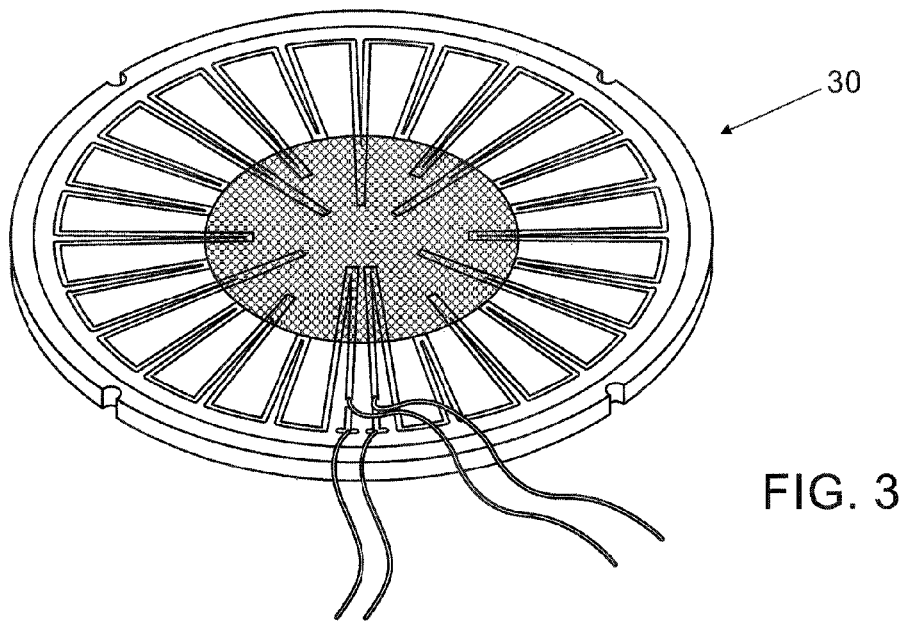
FIG. 3 shows schematically an assembled power measurement device of the type described in this application.
Figure 4:
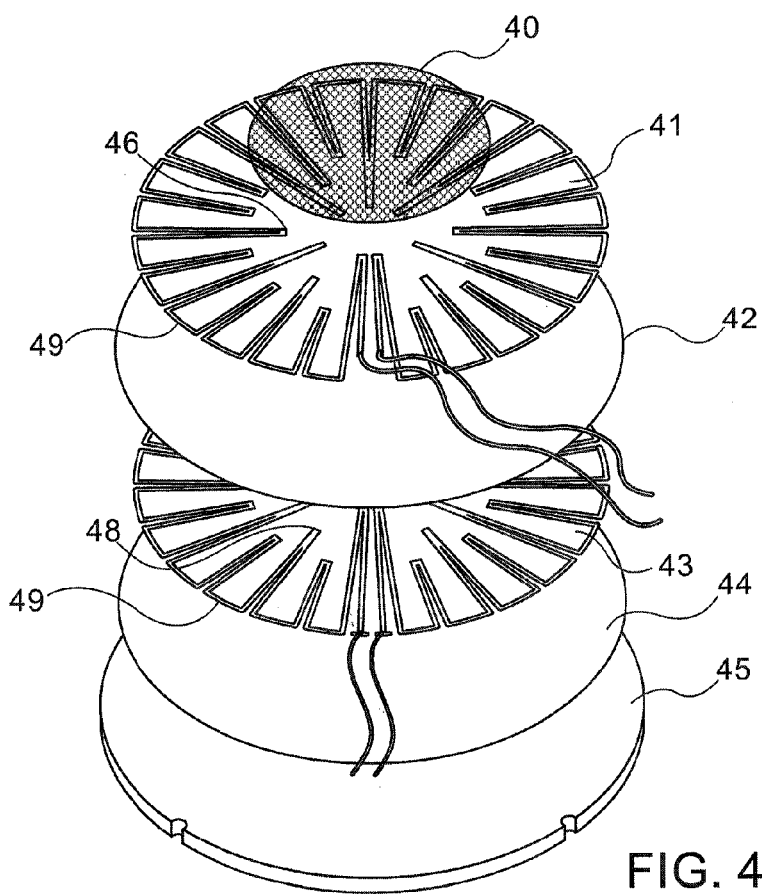
FIG. 4 illustrates schematically an exploded view of the device of FIG. 3.

Reference is now made to FIGS. 3 and 4 which illustrate schematically an exemplary power measurement disc of a first type described in this disclosure. FIG. 3 shows an assembled disc 30 while FIG. 4 is an exploded view, showing the component parts. The device consists of a layered stacked structure, each of whose layers are in good thermal contact with their immediately neighboring layers, and comprising, in order from the power absorbing surface:

(i) an absorbing layer 40 capable of withstanding the incident beam power density;
(ii) a first radial thermopile 41;
(iii) a first insulating layer 42;
(iv) a second radial thermopile 43;
(v) a second insulating layer 44; and
(vi) a conductive heat sinking layer 45.

The radial thermopiles differ from the thermopiles used in the prior art discs as described above, in that the hot junctions 46 extend towards the center of the disc assembly, and are spread over the entire area in the region opposite the surface 40 where the beam impinges, such that they directly intersect the heat generated by the impinging beam.

The operation of these sensors differs from that of prior art discs in that the heat flows primarily in the axial direction, since the whole of the area of the conductive heat sinking layer 45 is cooled. Since the axial path length from the absorber surface 40 to the heat sinking layer 45 is substantially shorter than the radial distance from the center region of the disc to the periphery, the response time of this disc assembly is accordingly substantially shorter than that of the prior art radial conduction discs, where heat had to flow from the center region along a long radial path to the periphery. Since the hot junctions of the thermopiles are extended radially inwards to the central area of the disc assembly, the laser beam impinges the absorber disc in the region of the hot junctions. The heat from this beam impingement flows axially through the disc assembly until it reaches the cooled heat sink at the opposite end of the stack to the absorber surface. This axial heat flow causes a temperature difference across the first insulating layer 42, and thus the temperature of the hot junctions 46 of the first radial thermopile 41 is higher than the temperature of the hot junctions 48 of the second radial thermopile 43. This difference of temperature between the two sets of hot junctions is proportional to the heat flow passing through the first insulating layer, which is proportional to the power of the beam impinging on the top absorber surface 40. Since the cold junctions 49 of both of the radial thermopiles are situated remotely from the axial heat flow through the central region of the disc structure, they are substantially at the same temperature, such that the voltage measured at the output of each thermopile, being proportional to the difference temperatures between the hot junctions in the cold junctions, is essentially proportional to the temperature in the center region of that thermopile. Thus by measuring the difference in output voltages from the first and second radial thermopiles, a measure of the impinging beam power can be obtained.

The exemplary implementation shown in FIG. 4 utilizes separate layers for the six functional parts (i) to (vi) described above. Thus the top absorber layer 40 could be constructed of a ceramic absorber capable of withstanding the high power density of the incident beam, such as a black oxide layer, or a black anodized aluminium disc capable of withstanding the required power density, or any other suitable absorber material. This layer could advantageously be conformally deposited onto the top of the sensor device. The thermopiles and insulating layers could likewise be vacuum or plasma sprayed deposited materials on a metallic substrate. Alternatively, the insulating layers can be thin alumina discs, and the thermopiles could be printed or deposited onto electrically insulating thin discs. However it is to be understood that the invention is not meant to be limited by this construction, and that some layers may be combined in order to simplify the construction. As an example, the first radial thermopile and the first insulating layer could be constructed in the form of a thin disc of aluminium, anodized on both sides, and with the thermopile disposed on one surface. Alternatively, both thermopiles could be deposited on opposite sides of a thin insulating disc, and this composite disc sandwiched between the absorber disc and the cooled heat sink disc. This embodiment could be particularly advantageous, since the sensing element comprising the thermally insulated disc with the two thermocouples then has a predetermined configuration and calibration constant, independent of how the complete device is assembled. Other such combinations are also possible. The conductive heat sinking layer may conveniently be made of a copper or aluminium substrate cooled by water flow. In the latter case, an anodized layer on the aluminium could function as the second insulating layer. The absorber layer could be a ceramic layer deposited on the top surface of the device, or a separate plate with an absorber surface clamped on top of the upper thermopile disc.

Figure 5:
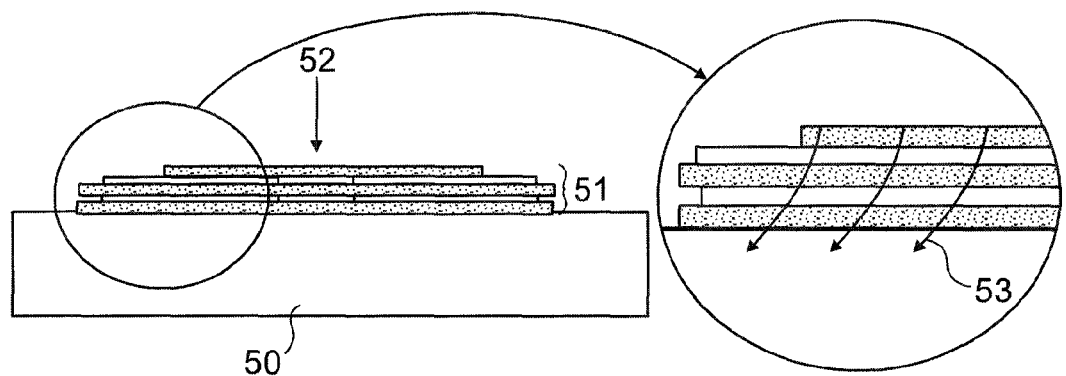
FIG. 5 is a schematic illustration of the cross section of a power meter head incorporating a thermal disc assembly of the type shown in FIGS. 3 and 4.

Reference is now made to FIG. 5, which illustrates schematically a cross section of a power meter head 50 incorporating a thermal disc assembly 51 of the type described in this application with the power 52 incident on the center of the disc. The arrows 53 in the magnified insert drawing show the general disposition of the heat flow in such a head. In addition to the axial heat flow, there is also some radial heat flow, since the center region of the absorber disc is being heated, while the periphery is not, such that there is a temperature gradient from the center outwards. However, this radial flow is approximately the same for the upper and lower thermopiles, and is therefore cancelled out if the output of the two thermopiles is adjusted so that the radial component is the same, and the voltage difference between the two outputs is taken. The heat flow arrows 53 in the magnified insert show the predominantly axial heat flow together with a radial component.

Figure 6:
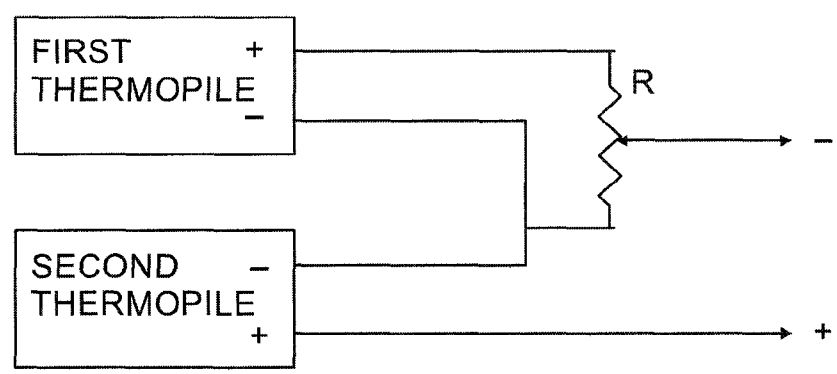
FIG. 6 illustrates schematically a simple circuit for processing the output of the thermopiles used in the devices of FIGS. 3 and 4.

Since the main resistance to the axial heat flow arises from the presence of the insulating layers in the flow path, the difference in temperature of the hot junctions of the first thermopile from that of the cold junctions should be approximately twice that of the hot junctions of the second thermopile. This arises the fact that the heat flowing axially through the central region of the first thermopile has to traverse two insulating layers on its way to the heat sink, while that through the second thermopile has to traverse only one in order to reach the heat sink. Consequently the voltage generated on the first thermopile is about twice that of the second thermopile. In order to eliminate the slowly changing radial heat flow voltage such that only the fast responding axial heat flow voltage is measured, the relative contributions of the two thermopiles can be adjusted so that the radial component is canceled out and the axial component remains. This can be performed using a simple circuit, such as that shown in FIG. 6 where the radial component of the outputs from the two thermopiles are adjusted to be equal in amplitude by means of the potentiometer R, and the output of the second thermopile is subtracted from the normalized output of the first thermopile thus eliminating the radial component. This adjustment is made in practice by looking at the response time of the sensor and adjusting the potentiometer until the fastest response time is obtained.

Figure 7:
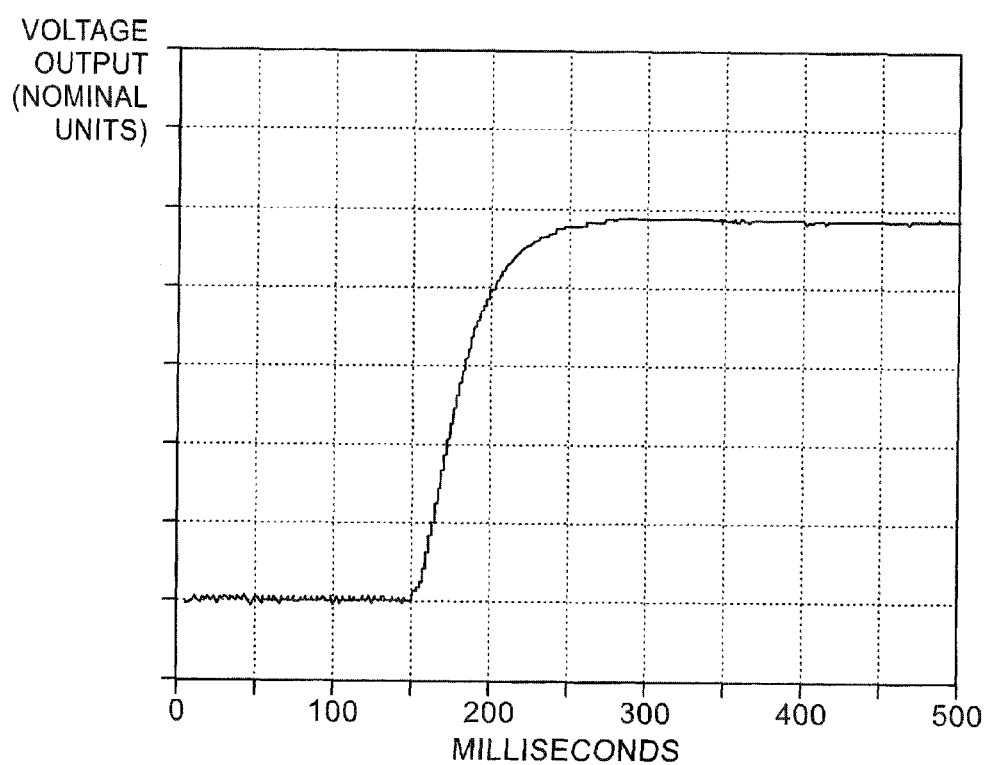
FIG. 7 is a graph illustrating the response time of a power measurement device of the type shown in FIGS. 3 and 4.

There exists a problem with laser power meters for very high powers with acceptable response times, using the prior art radial flow technology, since all of the power has to flow radially through the disc, and in order to provide the ability to withstand the very high power flows, the disc must be made very thick and the response time is consequently very slow. Reference is now made to FIG. 7, which shows the measured response time of an exemplary axial thermopile, capable of handling over 100 W of input power, using a software response time accelerating algorithm of the type used in prior art thermopile sensors. The response time is approximately 50 ms for 10-90% response time, an improvement of some 20 times over the fastest prior art thermopiles of similar power handling capacity. For example the Ophir 50(150)A-BB-26 sensor, available from Ophir Optronics Ltd. of Jerusalem, Israel, which has a similar power handling capacity to the axial thermal sensor whose response is shown in FIG. 7, has a response time for 10-90% of approximately 1 second, which is 20 times slower than the corresponding axial type.

The power measurement disc assemblies described hereinabove have the advantage of greatly increased response time, compared with conventional radial measurement discs. However they also have a comparative disadvantage in that the sensitivity of the disc assemblies may be somewhat dependent on beam shape and size and on the beam's position of impingement on the absorber, since the response output depends upon measurement of the heat falling on the specifically located hot junction thermocouples, and not on the integrated total of heat falling within the peripheral thermocouples of the prior art radial flow technology. However, there exist many applications for a fast thermal sensor of the type described here within, where the beam size, position of impingement, and shape is constant, such that this limitation is not problematic. One such use is for OEM installation within laser equipment, where the beam size, shape, and point of impingement will generally be constant.

Figure 8A:
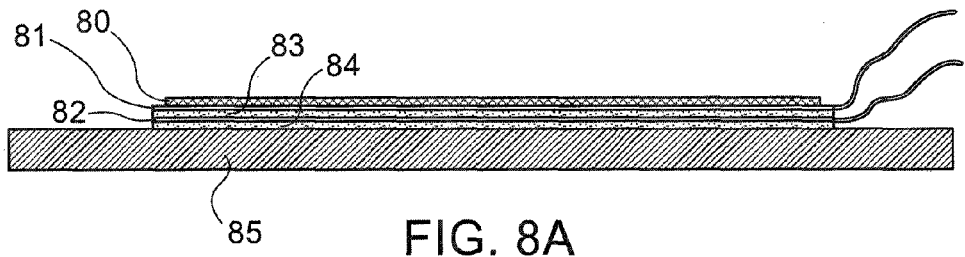
FIGS. 8A and 8B illustrate schematically a large area high-power laser power meter, in cut-away and plan views respectively, constructed using axial flow power measurement devices of the type of shown in FIGS. 3 and 4.
Figure 8B:
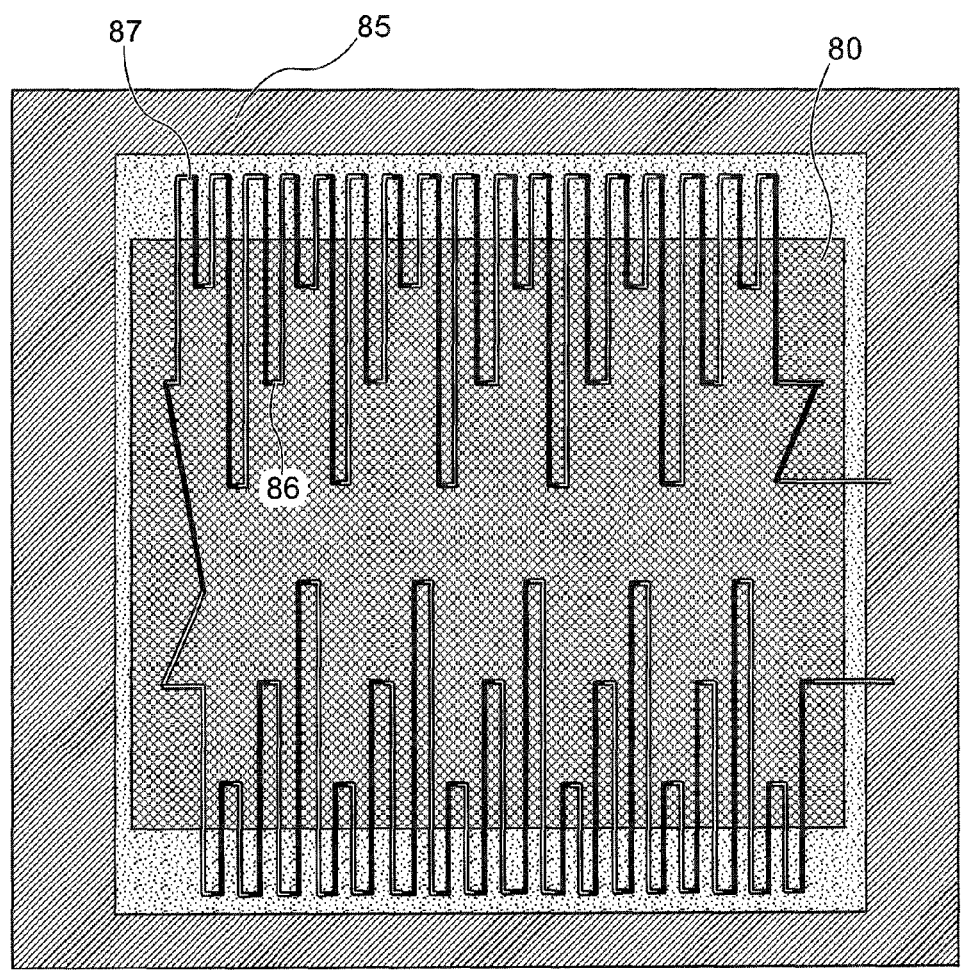

Reference is now made to FIGS. 8A and 8B, which illustrate a further exemplary implementation of the axial flow power detectors disclosed in this application, and which solves the problem of providing high response time together with high power measurement capability. A plan view is shown in FIG. 8B, and a cut-away sectional view of the power detector is shown in FIG. 8A. In a similar manner to the previously described axial flow detector devices, this implementation comprises a pair of thermocouple arrays 81, 82, each array having its thermocouples serially connected, the two arrays sandwiching an insulating layer 83 to provide the temperature drop arising from the axial heat flow. An absorbing surface 80 is provided on one thermocouple array, on which the incident beam impinges, and a heat sinking plate 85 mounted on the thermocouple array at the opposite end of the stack, and insulated therefrom by another insulating layer 84. Each thermocouple array (of which only one is seen in the plan view of FIG. 8B) comprises a number of serially connected thermocouples deposited across a large area plate, with the hot junctions 86 disposed over the whole of the area of the plate where the beam is allowed to impinge, and the cold junctions 87 situated at the edges of the array area, protected from the impinging beam. The total flow of heat from the top beam absorber layer 80 to the lower conductive heat sinking layer 85 is integrated over the whole of this active area, with the integrated heat flow being measured, as previously, by the differences in output of the two thermocouple arrays 81 82, which represent the integrated heat flow across the thermally insulating layer. As previously, since there is little axial heat flow at the edges of the arrays, the temperatures of the cold junctions of the two arrays are close, and the heat flow is essentially proportional to the integrated array outputs which is due to the differences in temperatures of the hot junctions.

Figure 9A:
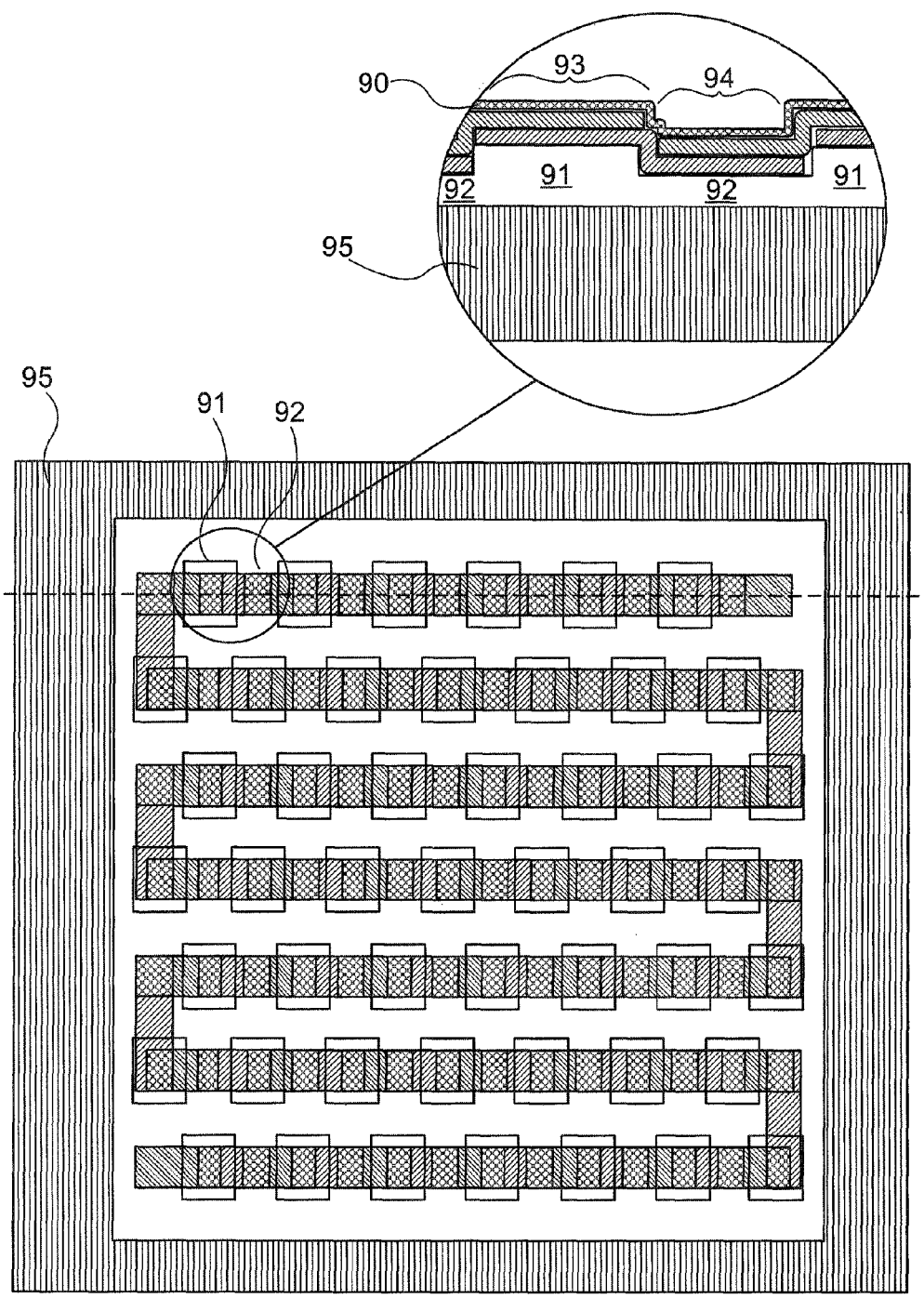
FIG. 9A illustrates schematically an alternative large-area high-power and faster response laser power meter sensor, in cross section and plan views, constructed using an axial flow power measurement device based on adjacent thermocouples with the hot junction on a thicker insulating layer than the cold junctions.

Reference is now made to FIG. 9A, which illustrates schematically in cross section and plan views, an alternative optical power meter sensor disc to that shown in FIGS. 8A and 8B, having a simpler construction, since only one array of thermocouples need be used. This is achieved by forming the thermal insulating layer, which generates the temperature gradient from the axial heat flow, in the form of an array of individual regions of greater thickness 91 and lesser thickness 92. A single array of thermocouples may then be deposited, with the one set of junctions 93 formed on the regions of greater thickness, and another set of junctions 94 on the regions of lesser thickness. The two different metals making up the thermocouples are shown in both views of FIG. 9A with cross hatching in different diagonal directions. The thermocouple arms of one metal are advantageously first formed over the whole of the area of the sensor, each in its specific location, as shown in the plan view, and then the thermocouple arms of the second metal are formed over the whole of the sensor, with the two metals touching at the predefined position of each junction. In the plan view of FIG. 9A, the thermal insulating pedestal regions of greater thickness 91 are shown as rectangles. The increased temperature gradient formed across the regions of greater thickness 91 makes the junctions on these regions hotter than those on the regions of lesser thickness 92, such that the former are the hot junctions 93 and the latter the cold junctions 94. In this implementation, the hot and cold junctions which measure the temperature gradient due to the axial heat flow, are thus adjacent and in a single series thermopile array, in contrast to the earlier implementations shown in FIGS. 3 to 8, where the "hot" junctions which measure the temperature gradient due to the axial heat flow, are in fact two separate sets of "hot" junctions arranged collinearly to the axial heat flow.

The sum total of the voltages generated by the serial hot and cold junctions distributed over the area of the sensor disc is thus proportional to the total integrated axial heat flow through the sensor disc, which is a measure of the absorbed power. Although the thermocouples are shown in FIG. 9A as a single long serial array, it is to be understood that the array may be split up for convenience into several separate array sections, connected in series.

The absorber may be applied as an absorbing coating 90 conformably applied to the top of the array, such that it allows heat flow to the whole of the area of the sensor. The entire assembly may be deposited by means of any suitable thin layer planar deposition technique onto the cooled plate 95, which removes the incident heat of the axial flow. The implementation shown in FIG. 9A has the advantage over that of the previous implementations in that the device can be more readily constructed using fewer planar deposition steps or assembly steps. Although this implementation has been illustrated in FIG. 9A and described for use as a large area, high power sensor, it is to be understood that it can be realized equally well, and with the same performance advantages, on the small area sensors, as shown in FIGS. 2 to 5, with the patterns scaled accordingly.

Figure 9B:
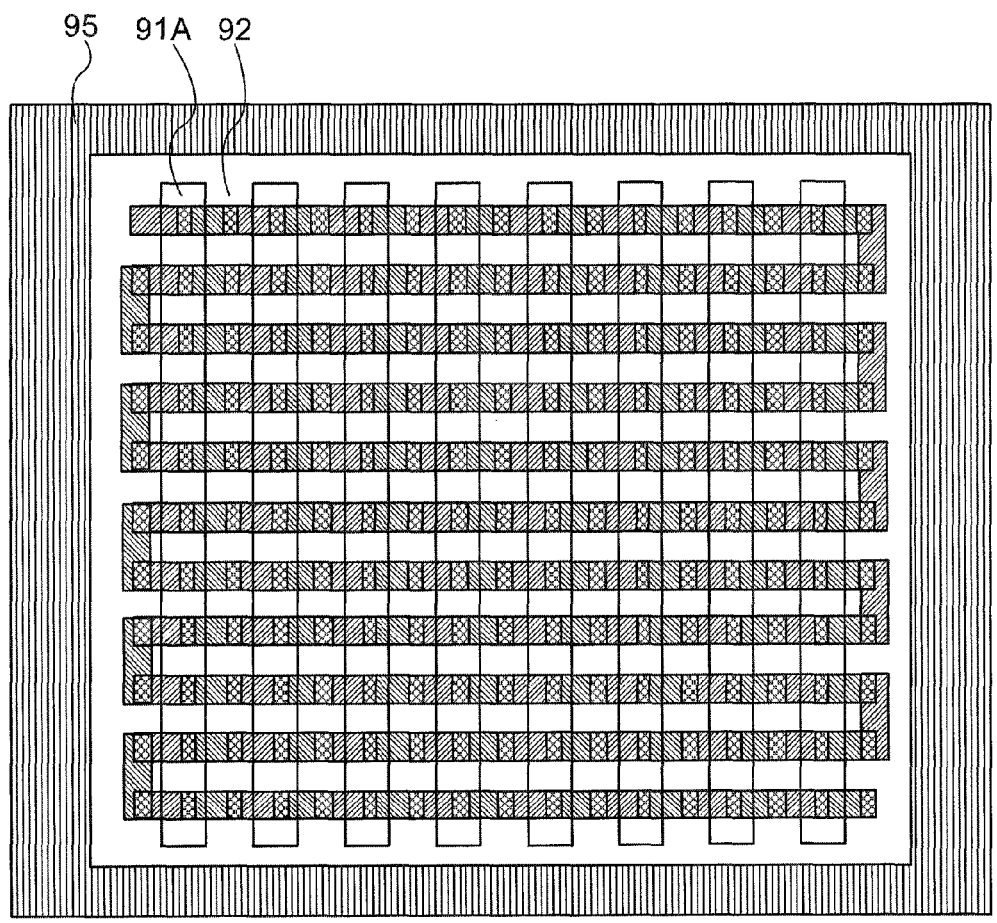
FIG. 9B illustrates schematically a sensor similar to that shown in FIG. 9A, but having a different geometric structure for its insulating layer.

Reference is now made to FIG. 9B, which illustrates an alternative construction for the thermally insulating layer, in which the raised regions of greater thickness are in the form of strips 91A of greater thickness, rather than isolated pedestals. The other parts and functions of the sensor disc are the same as for FIG. 9A. This geometry may have advantages in the ease of constructional of the sensor.

Figure 10:
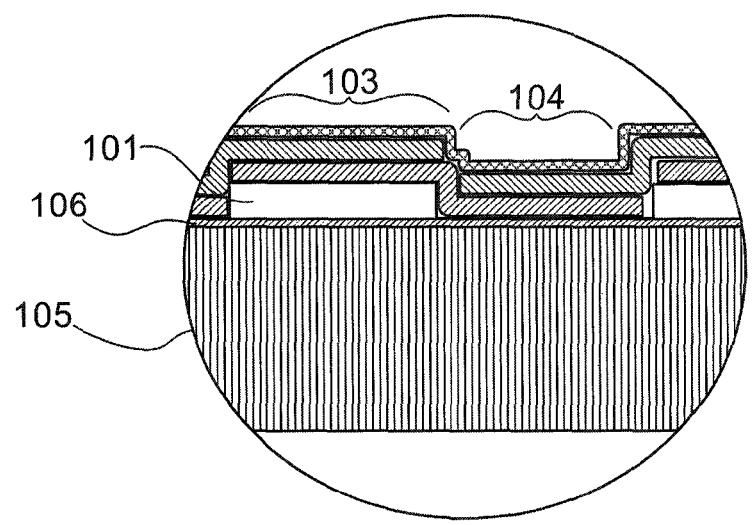
FIG. 10 illustrates schematically the cross sectional view of a high power laser meter head of the type shown in FIGS. 9A and 9B, using an anodized aluminium plate as the heat sink.

In the exemplary sensors shown in FIGS. 9A and 9B, the thermally insulating layer is shown as a continuous layer with thicker and thinner regions. Reference is now made to FIG. 10, which illustrates schematically a cross sectional view of an alternative construction in which the insulating layer is constructed by depositing an array of isolated pedestals 101 of the insulating material over the area of the heat sink disc 105, which itself has a uniform insulating layer 106 over its surface, such as a simple anodized aluminium plate. The hot junctions 103 would thus be deposited on the pedestals, and the cold junctions 104 right on the insulated coating 106 of the heat sink plate. Such a structure may make the construction simpler.

In general, the materials of construction of the detector devices described in this disclosure are those conventionally used for thermopile power detector. Thus, the thermopile can be of any two dissimilar metals as commonly used in thermocouples, such as chromel/alumel; the insulating layers can be typical insulating ceramic materials and the absorbing layer may a ceramic material which absorbs the incident radiation in the spectral range where the device is intended to operate. The deposition method can be plasma spray or sputtering or any other suitable method.

Throughout this disclosure, when reference is made or claimed to a serial array of thermocouples, it is to be understood that this term is meant to include implementations where the serial array is divided up into two or more sub-arrays, whose outputs are then added externally to the sensor itself.

Figure 11:
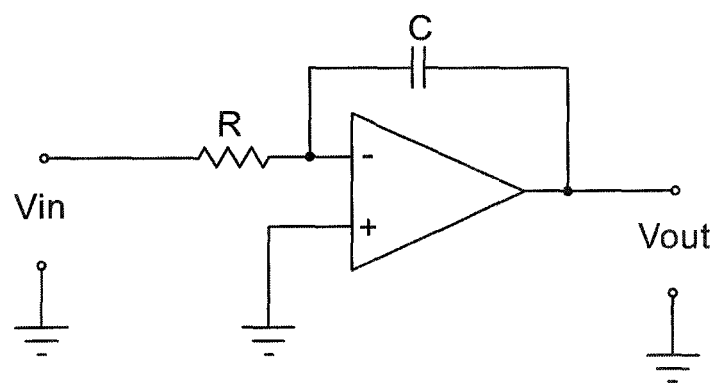
FIG. 11 illustrates schematically an exemplary integrating circuit enabling the energy of one or more pulses of an incident beam to be measured using the above described devices.

Finally, the present devices, according to their various above-described configurations, can also be used to measure the energy of a pulsed laser by integrating the electrical signal generated by the heat flow of the pulse through the thermopile. FIG. 11 shows an exemplary and non-limiting integrator circuit that could be used for making such an energy measurement. The power signal generated by the sensor disc is input as $V_{in}$ to the integrator, and the integrated output $V_{out}$ provides a signal proportional to the measured energy of the pulse or pulse train. In prior art radial heat flow thermopiles, due to the slow response time, pulse measurements can be made only in the order of 1 pulse every 3-5 seconds. Since devices of the present disclosure have a response time some 20 times that of the prior art radial flow thermopile, it should be now possible to measure pulses at rates up to 10 Hz or so.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A measuring device for an optical beam comprising:
   a cooled heat sinking element;
   thermally insulating material disposed on said heat sinking element, said thermally insulating material having a periodic array of adjacent regions of greater and lesser thickness;
   thermocouples applied in at least one serial array over said thermally insulating material, said at least one serial array having a first set of junctions disposed on said regions of greater thickness and a second set of junctions disposed on said regions of lesser thickness; and
   a surface for absorbing said optical beam, disposed over said thermally insulating material and its associated a least one array of thermocouples,
   wherein said cooled heat sink is configured such that at least a majority of said thermally insulating material and its applied thermocouples are disposed thereon.

2. A measuring device according to claim 1 wherein said thermally insulating material comprises a single layer disposed on said cooled heat sinking element, said single layer having regions of greater thickness and regions of lesser thickness.

3. A measuring device according to claim 1 wherein said thermally insulating material comprises regions of said thermally insulating material disposed on a thin insulating coating applied to said cooled heat sinking element.

4. A measuring device according to claim 1 wherein said regions of greater thickness of said thermally insulating material comprise separate pedestals, on each pedestal being disposed one of said first set of junctions.

5. A measuring device according to claim 1 wherein said regions of greater thickness of said thermally insulating material comprise separate strips on which are disposed a linear plurality of said first set of junctions.

6. A measuring device according to claim 1 wherein at least one of said thermocouples at said first set of junctions comprises:
- a first thermoelectric layer disposed on a region of greater thickness and bridging down to a first adjacent region of lesser thickness; and
- a second thermoelectric layer in contact with said first thermoelectric layer on said region of greater thickness and bridging down to a second adjacent region of lesser thickness located at the side of said region of greater thickness opposite to that of said first adjacent region of lesser thickness.

7. A measuring device according to claim 1 wherein at least some of said thermally insulating material, said serial array of thermocouples, and said surface for absorbing said optical beam comprise plasma sprayed layers.

8. A measuring device according to claim 1 wherein at least some of said thermally insulating material, said serial array of thermocouples, and said surface for absorbing said optical beam comprise sputtered layers.

9. A measuring device according to claim 1, further comprising an integrating circuit receiving the electrical output from said serial thermocouple array, such that the energy of at least one pulse of said beam can be determined by integrating over time said electrical output arising from said at least one pulse.

10. A device for measuring an optical beam, said device comprising:
- a thermopile having a first type of its junctions disposed on thicker regions of a thermally insulating layer, and a second type of its junctions disposed on adjacent regions of said thermally insulating layer, said adjacent regions having a thickness less than that of said thicker regions;
- a surface for absorbing the power of said optical beam, said surface being disposed in thermal contact with a first surface of said thermopile; and
- a heat sinking element disposed in thermal contact with said thermally insulating layer on a side thereof adjacent to a second surface of said thermopile, said heat sinking element being disposed in contact with at least a majority of said second thermopile surface,
- wherein the electrical output of said thermopile provides a measure of the optical power of said beam impinging on said absorbing surface.

11. A measuring device according to claim 10 wherein said thermally insulating material comprises a single layer disposed on said heat sinking element, said single layer having regions of greater thickness and regions of lesser thickness.

12. A measuring device according to claim 10 wherein said thermally insulating material comprises regions of said thermally insulating material disposed on a thin insulating coating applied to said cooled heat sinking element.

13. A measuring device according to claim 10 wherein said regions of greater thickness of said thermally insulating material comprise separated pedestals, on each pedestal being disposed one of said first set of junctions.

14. A measuring device according to claim 10 wherein said regions of greater thickness of said thermally insulating material comprise separate strips on which are disposed a linear plurality of said first set of junctions.

15. A measuring device according to claim 10, further comprising an integrating circuit receiving said electrical output from said thermopile, such that the energy of at least one pulse of said beam can be determined by integrating over time said electrical output arising from said at least one pulse.

* * * * *